Figure 4:
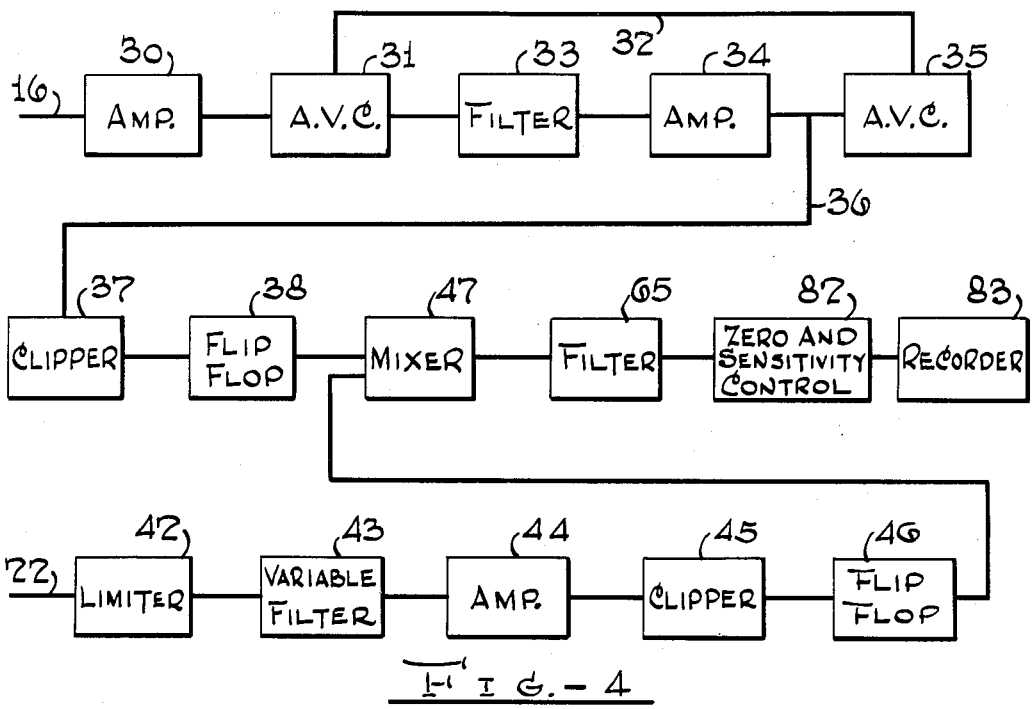

June 19, 1956
M. J. E. GOLAY
2,750,834
SPECTROMETRIC METHOD AND APPARATUS
FOR DETERMINING RADIATION RATIOS
Filed Feb. 25, 1952
4 Sheets-Sheet 1
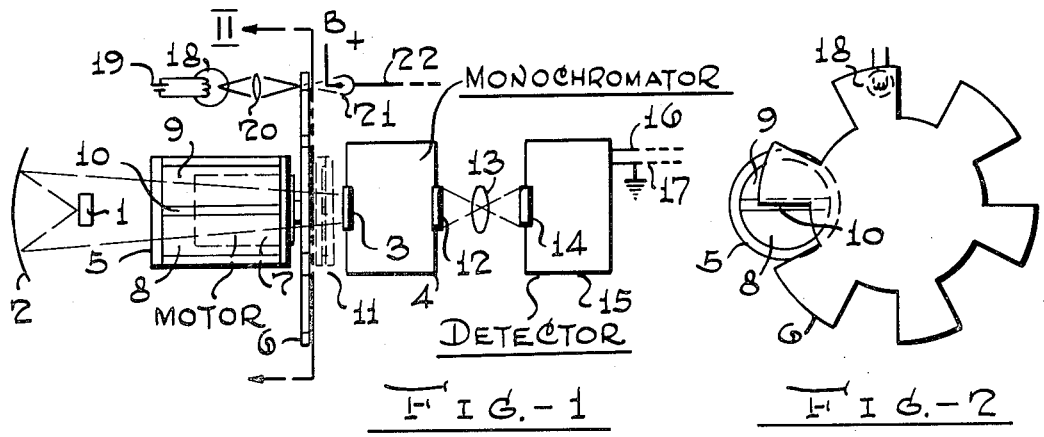
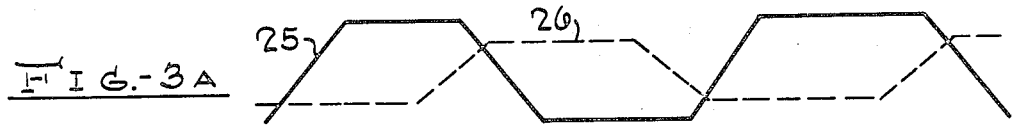
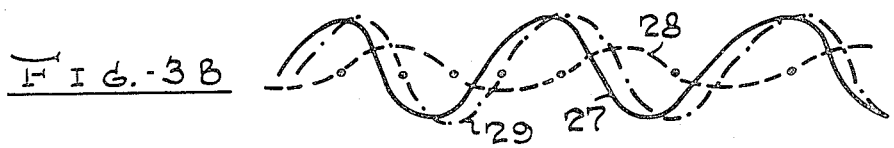
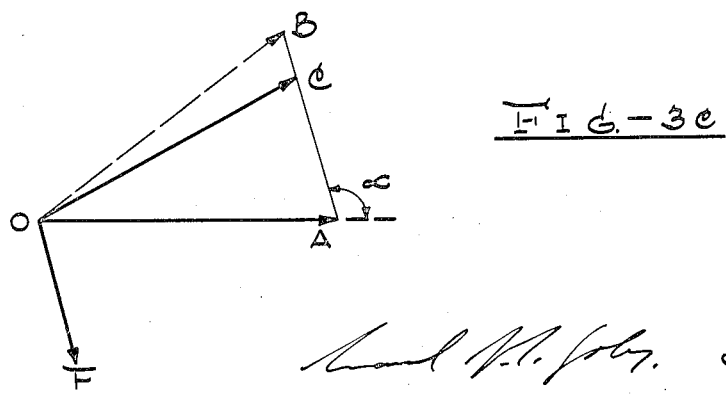

June 19, 1956

M. J. E. GOLAY 2,750,834

SPECTROMETRIC METHOD AND APPARATUS
FOR DETERMINING RADIATION RATIOS

Filed Feb. 25, 1952

4 Sheets-Sheet 2

Marcel J. E. Golay, Inventor

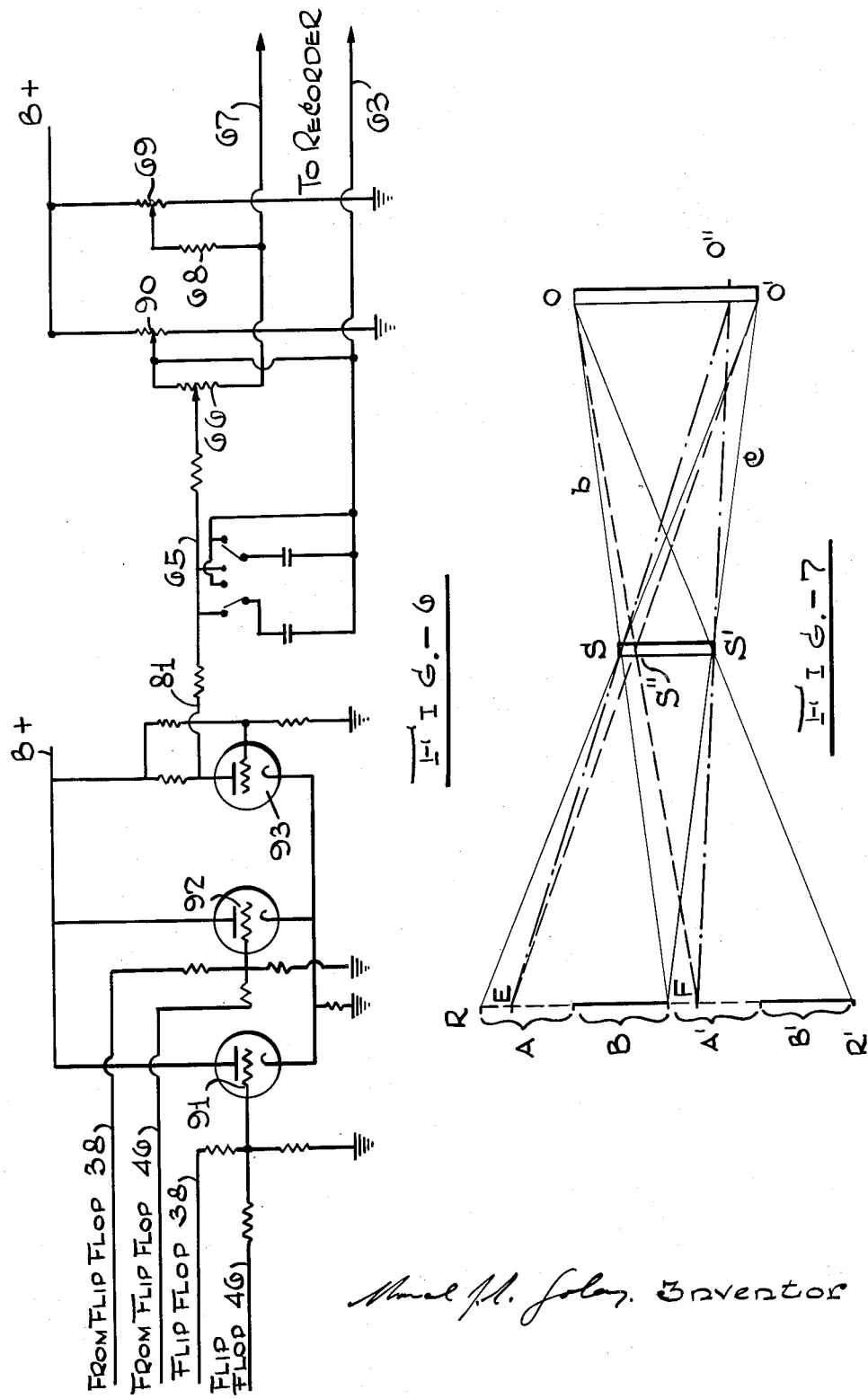

June 19, 1956 M. J. E. GOLAY 2,750,834
SPECTROMETRIC METHOD AND APPARATUS
FOR DETERMINING RADIATION RATIOS
Filed Feb. 25, 1952 4 Sheets-Sheet 4

Marcel J. E. Golay, Inventor

United States Patent Office 2,750,834
Patented June 19, 1956

2,750,834
SPECTROMETRIC METHOD AND APPARATUS FOR DETERMINING RADIATION RATIOS

Marcel J. E. Golay, West End, N. J.

Application February 25, 1952, Serial No. 273,195

21 Claims. (Cl. 88—14)

This invention concerns a novel technique of spectrometry providing for the splitting of a beam of radiation into two beams and providing an effective manner of determining the ratio of energy in the two beams of radiation. The invention may be embodied in a double beam spectrophotometer particularly characterized by a novel beam splitting arrangement and a novel method of determining the ratio of radiation in the two beams of radiation provided. A system of radiation phase modulation is employed, permitting utilization of a simple apparatus in which optical and electronic means are used to provide a directly recordable D. C. voltage indicating the radiation transmission ratio of the two optical paths. The principles of this invention may be applied to any desired portion of the electromagnetic spectrum for measuring radiation ratios, radiation transmission ratios, and the percentage transmission of substances.

The outstanding features of this invention may be appreciated by briefly identifying the objectives attained:

It has heretofore been appreciated that radiation may be subjected to phase modulation in spectrometric applications. In practical applications of this principle in spectrophotometers however, it has been necessary to employ "make-and-break" electrical contacts. Again it has heretofore been necessary to compare two D. C. signals to obtain the desired ratio of the radiation energy passed along two optical paths.

It is one object of this invention to provide a phase modulation system of spectrometry in which "make-and-break" electrical contacts are not required.

It is an additional object of this invention to provide a single D. C. signal output which will directly indicate the ratio of radiation energy in two beams of radiation without the need to compare two D. C. signals for this purpose.

A further object of the invention is to provide a radiation splitting arrangement in which equal proportions of the two beams of radiation are inherently passed through every portion of an entrance slit and through every portion of the essential optical element which is employed; for example, the dispersing element of a monochromator. This provision permits the practical elimination of the effect of undesired unbalance or misproportioning of the radiation of two beams in passage through the optical system of a spectrometer, such as may result from a misalignment of the slits.

The present invention embodies a system of radiation phase modulation utilizing a phase difference of more than 90° and preferably less than 120° between two radiation beams. For this purpose a mechanical "chopper" arrangement sequentially interrupts radiation in the two beams at the same rate but with a phase difference of the magnitude indicated. The two chopped beams of radiation are both impressed on a single detector coupled to an electronic system which utilizes only the fundamental harmonic components of the detected signals. In other words, the detector together with the filtering system, derives from the chopped beams of radiation a sinusoidal signal. This sinusoidal signal is converted to D. C. pulses of constant amplitude and constant length, but having a phase varying in accordance with the ratio of intensity of the two beams of radiation. These D. C. pulses are then mixed with D. C. pulses of constant phase so as to produce resulting pulses, the length of which vary in accordance with variations in intensity of the radiation in the two chopped beams falling on the detector. These pulses may then be filtered to provide a D. C. voltage proportional in magnitude to the ratio of intensity of the two beams of radiation.

This general system may be further refined by employing a particular beam splitting arrangement of the character hereinafter described.

With this brief identification of the features of this invention, the invention may be fully understood by reference to the following description and the accompanying drawings, illustrating the basic principles, a preferred embodiment, and specific refinements of the invention.

In the drawings, Figures 1 and 2 together diagrammatically represent a mechanical and optical arrangement which may be employed to practice the phase modulated detection system of this invention. Figure 1 is a plan view of the apparatus while Figure 2 is a view of Figure 1 along the line II—II of Figure 1.

Figures 3a, 3b, and 3c represent variations in radiation intensity falling on the detector, the resultant variations in electrical voltage in the electrical system to be described, and the vectorial manner of representing these variations.

Figure 5A:
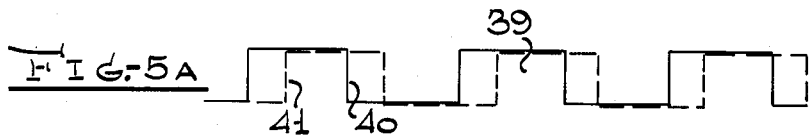
Figure 5B:
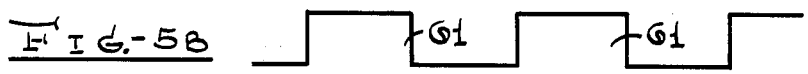
Figure 5C:
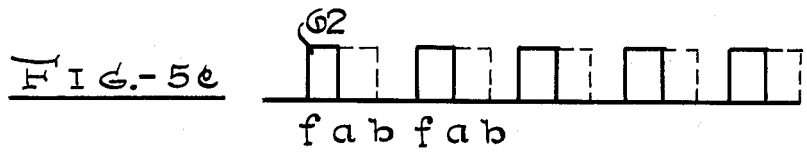

Figure 4 is a block diagram of the complete electronic circuit which may be employed with the apparatus of Figures 1 and 2. Figures 5a, 5b, and 5c, represent the electrical signals at different portions of the electrical circuit of Figure 4.

Figure 6 diagrammatically shows a preferred form of circuit arrangement providing sensitivity and zero control for the circuit of Figure 4 at the output portion of the circuit.

Figure 7 diagrammatically illustrates an improved form of beam splitting means which is preferably incorporated in the invention.

Figure 8:
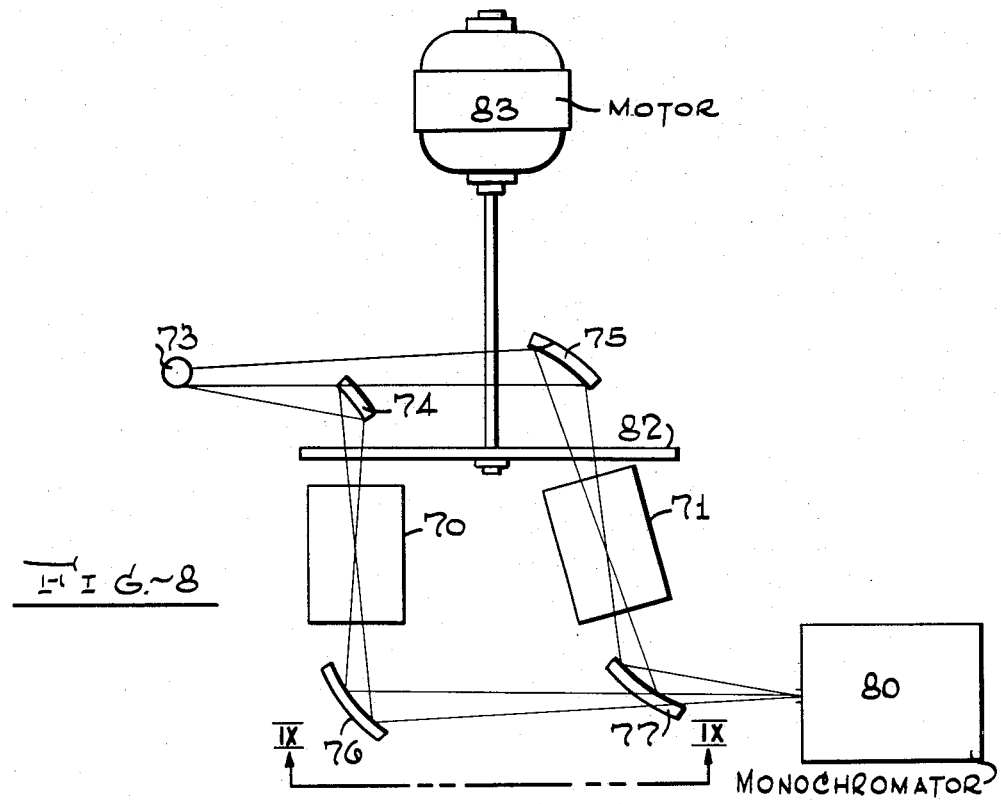
Figure 9:
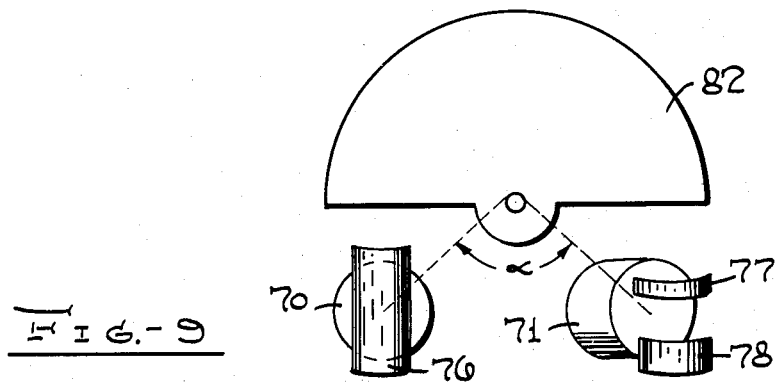

Figures 8 and 9 together illustrate an apparatus embodying the beam splitting principle illustrated in Figure 7 which utilizes the phase modulation system of Figures 1–6. In these views, Figure 8 is a plan view of the optical and mechanical system while Figure 9 is a view of Figure 8 taken along the lines IX—IX.

The phase modulation system of this invention will first be described in conjunction with Figures 1–6 of the drawings. As stated, this system is broadly applicable to the measurement of radiation ratios in any application in which this is desired. By way of example, the phase modulation system is illustrated as it may be employed in a double beam spectrophotometer.

Figures 1 and 2 show the simple mechanical and optical arrangement which may be employed. Radiation from a source 1 is focussed by convergent mirror 2 onto the entrance slit 3 of monochromator 4. It is to be understood that source 1 may comprise any desired source of radiation selected for the particular spectral range to be used. For example, the source can be a hydrogen arc, an incandescent tungsten filament, a Nernst glower, a "globar," or the like. A "chopper" 6 is positioned in the path of the radiation between source 1 and monochromator slit 3 to permit the periodic sequential interruption or blocking of the radiation beams reaching the monochromator. The chopper may constitute an opaque plate having the configuration shown in Figure 2. The tines and cutaway portions of the chopper are preferably of the same area. A motor 7 rotates chopper 6 to interrupt the radiation in the manner indicated at any desired frequency.

A chopping frequency of 10 cycles per second is satisfactory for many applications.

A pair of optical cells 8 and 9 are fixed in the path of the radiation between source 1 and monochromator slit 3 through the rotating tines of the chopper. Cells 8 and 9 are arranged so that rotation of each tine of the chopper will first block radiation passing through one cell and will then immediately thereafter block radiation passing through the other cell. The two beams of radiation passing through the two cells will therefore be interrupted at the same frequency but with a phase difference which should be a little over a quarter of the off-on interruption cycle. It is essential in this practice of this invention that the phase difference, expressed in degrees, be adjusted so as to be greater than 90° and less than 180°, and preferably less than 120°, as may be appreciated hereinafter.

To suitably position the two optical cells 8 and 9, it is convenient to employ a split cell 5 including the partition 10 which demarks the individual cells 8 and 9. Partition 10 is radially disposed with respect to the center of rotation of chopper 6 so as to maintain cell 9 above cell 8 in the chopping path. According to standard principles of spectrometry, one of the cells is to be employed as a "standard cell" while the other of the cells is to be employed as a "sample cell." A gas to be analyzed may be placed in the sample cell while the standard cell may be evacuated or may be filled with a gas having no radiation absorption bands in the spectral region of interest, or having absorption characteristic similar to those of one or more of the components of the gas to be analyzed. In the event the absorption spectrum of a solid or liquid is required, a double cell of the character identified by numeral 11 may be used in place of cells 8 and 9.

Radiation passing from the exit slit of monochromator 4 is condensed by lens 13 onto sensitive element 14 of the radiation detector 15. The detector may be of conventional character selected for the particular spectral portion employed in the analysis, providing an electrical output signal through leads 16 and 17 proportional to the intensity of radiation impinging on the sensitive element of the detector.

It is apparent that the monochromator 4 may be dispensed with in the event the apparatus is to be employed as a double beam non-dispersion analyzer. Selective analytical results may be obtained in this case by employing "filter" and "compensator" cells containing selectively absorptive compositions in place of the monochromator.

In order to provide a phase reference signal, an incandescent light 18, energized by battery 19, for example, is arranged to pass light through the chopping path of chopper 6 to a photocell 21. A condensing lens 20 is preferably employed to focus the light on the photocell. The light reaching the photocell 21 is therefore interrupted at the same frequency as the radiation passing through the optical cells 8 and 9. The electrical output of photocell 21, carried by conductor 22, is employed in the electronic circuit to be described. If desired, this same reference signal may be obtained by placing photocell 21 to receive reflected light from the tines of the chopper. A variety of other means may be employed to obtain this phase reference signal. For example, "make-and-break" electrical contacts associated with the chopper could be employed.

The interruption of radiation passed through cells 8 and 9 causes a periodic variation in the intensity of radiation falling on detector 15 as illustrated by Figure 3a. In Figure 3a, full line 25 represents variations of intensity provided by a first beam of radiation passing through cell 9, while dashed line 26 represents the variations in intensity of the other beam passing through cell 8. As illustrated, these variations are approximately 120° out of phase.

The detector and the associated electronic system is employed to filter the variations of Figure 3a so as to essentially see only the fundamental harmonic components of these signals. Consequently, the electrical signals utilized in the electronic detector system are of the nature represented in Figure 3b. In Figure 3b, line 27 represents the sinusoidal fluctuations of that component of the signal which is provided by the first beam and line 28 represents the component provided by the second beam. As stated, signals 27 and 28 are preferably between 90° and 120° out of phase. Finally, dashed line 29 illustrates the resultant signal obtained by the combination of signal components 27 and 28.

The sinusoidal signal variations illustrated in Figure 3b may be represented as vectorial quantities of the nature indicated in Figure 3c. In Figure 3c, vector OA is used to represent the signal obtained from radiation passed through cell 8 which may be used as a standard cell. Vector AB (making an angle alpha of between 90° and 120° with vector OA) represents variations in radiation passed through cell 9, when cell 9 contains no sample gas, is evacuated, or is filled with the same gas as cell 8. In this connection cell 9 is preferably made somewhat smaller than cell 8 so that vector AB will at all times be somewhat shorter than vector OA. When cell 9 is filled with a sample gas which absorbs some of the radiation passed through this cell, a vector AC may be used to represent the smaller amount of radiation transmitted through this cell.

The resultant signals obtained by a combination of vector OA with vector AB or AC are represented by the resultant vectors OB or OC. The ratio of the length of vector AC divided by the vector AB therefore represents the radiation transmission of the sample when the transmission of the standard is set at unity. It is the particular feature of this invention that the phase angle AOC is used as the measure of the sample transmission. While the angle AOC is not precisely proportional to the length of vector AC, if the ratio of the angle AOC to angle AOB is plotted against the ratio of AC over AB, it will be found that the departure from this line will be small in all cases, and will be smaller, on the average, when the OAC angle approaches 90° and the maximum value of the AOB angle decreased correspondingly. Consequently, it is practical to employ the vectorial angle AOC as a measure of the sample transmission.

In accomplishing this objective a reference signal voltage is provided which establishes a vector signal OF, illustrated in Figure 3c. This vector OF is preferably about 90° out of phase with the bi-sector of angle AOB. In order to determine the phase angle AOC, an electronic circuit is provided to produce a series of D. C. pulses having constant amplitude but having a duration which is proportional to angle FOC. These pulses are filtered to provide a D. C. voltage proportional in magnitude to angle FOC. The subtraction from this D. C. voltage of a fixed voltage proportional to the fixed angle FOA yields a voltage proportional to angle AOC, i. e. very nearly proportional to the AC over AB vector length ratio.

A preferred form of circuit arrangement for accomplishing these objectives is illustrated in Figure 4. Reference will first be made in Figure 4 to the treatment of the signal of lead 16 provided by the detector 15 in Figure 1 in response to impingement of the two beams of radiation on the detector.

The signal carried by lead 16 in the apparatus of Figure 1 is supplied to an amplifier 30 and is thence passed to a second amplification stage 31 by means of a cathode follower. Amplifier 31 has a variable bias controlled by a feed-back signal supplied through conductor 32. Consequently, amplification stage 31 is employed as an AVC or automatic volume control stage. The output of amplifier 31 will vary inversely to the feed-back signal provided through lead 32 and may actually be lower than the input to stage 31.

The output of stage 31, preferably through a cathode follower, is supplied to a filter network 33 which is selected to filter out unwanted signals or "hum" at the power supply frequency. A double T filter network may be used for this purpose. Filter 33 also includes a second filter network which is employed to pass preferentially the chopping frequency provided by the chopper utilized in the apparatus of Figure 1. Again a double T network may be used for this purpose. This double T network, selective to the chopping frequency, may be connected between the plate and control grid of the following amplification stage 34 so as to selectively amplify signals having the chopping frequency. The output of amplification stage 34 is then supplied to an AVC feed-back circuit 35 suitable to provide an AVC signal to be passed through line 32 for use as described. Element 35 may consist of a double wave rectifier permitting feed-back of a negative voltage to stage 31.

The overall amplification of the system heretofore described is adjusted to provide enough amplification to handle the weakest signals the system is called on to detect. Again enough voltage control must be used to provide an output signal through lead 36 which is substantially constant in amplitude. For this purpose a suitable AVC arrangement is preferably employed to take care of a variation in signal amplitude of about 100 to 1.

The signal obtained through lead 36 from amplifier 34, having a substantially constant amplitude, is supplied to the clipper circuit 37. Clipper circuit 37 is arranged to drive the output plate of this stage in and out of conductivity so as to provide an output which is nearly a square wave. However, in the event the initial input signal supplied through conductor 16 decreases suddenly, the signals fed clipper 37 may be temporarily smaller before the automatic volume control can rectify this situation. Consequently, the output of clipper stage 37 is supplied to a flip-flop stage 38 which serves to provide substantially square pulses having the phase of the output pulses of the clipper stage, even when the clipper stage output pulses do not have steep sides. The flip-flop circuit is of the nature also identified as an Eccles-Jordan double stability circuit. Such a circuit employs two tubes, one of which is normally maintained conductive while the other of which is cut off. The signal produced at the output of flip-flop circuit 38 is of the nature illustrated in Figure 5a. At each ascent or descent of the voltage of clipper stage 37 a square pulse 39 will be produced. The amplitude of pulse 39 will at all times be constant but its phase will depend upon any change of angle AOC of Figure 3c. Thus for the case of 0% transmission through sample cell 9 when vector OC coincides with vector OA, the pulse will be the full line 40 of Figure 5a. In the case of 100% transmission through sample cell 9, vector OC of Figure 3c coincides with vector OB and the pulse will be the dashed line 41 of Figure 5a.

The reference signal voltage provided by photocell 21 conducted through lead 22 is supplied to the circuit of Figure 4 as shown. This reference signal voltage is first fed to a limiter stage 42 which serves to provide a substantially constant output over a large range of variations of the reference signal. Use of limiter stage 42 to provide a constant amplitude signal is possible since a large reference voltage may practically be obtained from the arrangement employed in Figure 1. The output of limiter 42 is supplied to a variable filter 43 which may consist of a double T network chosen to pass preferentially signals of the chopping frequency.

The essential function of adjustable filter 43 covers the case, not assumed in the foregoing description, in which speed of the chopping disc is subject to slight variations due, for example, to variations in the frequency of the A. C. supply when a synchronous motor drives the chopping disc. In this case, the phase of the output of filter 33 will vary in accordance with variations in the speed of the chopping disc, and the width of the frequency band passed by filter 43 is adjusted to compensate for the variation so that the relative phase of the signals derived from flip-flops 38 and 46 remains invariant against such slight variations of speed. When filter 43 consists of a double T resistance and capacitance network connected to the plate and the grid of an amplifying tube, this filter can be made conveniently adjustable by providing a variable degenerative resistance in the cathode circuit. The filtered signal is then supplied to an amplifier 44 and the amplified signal is then passed to clipper stage 45. Clipper 45 functions as clipper 37 to provide substantially square signal pulses. Again a flip-flop stage 46 is employed to further shape these pulses providing output pulses which are substantially square at all times. The output of flip-flop stage 46 is of the nature shown in Figure 5b, providing square pulses having constant amplitude, constant duration and constant phase.

The outputs of both flip-flop stages 38 and 46 are supplied to a mixer circuit 47, particularly illustrated in Figure 6. Mixer stage 47 utilizes two driving grids 91 and 92 on each of which are impressed the output of one each of the two pairs of tubes in the two flip-flop stages. Each driving grid serves to lift the voltage of the corresponding cathode in the mixer stage when the two flip-flop outputs connected to each grid is at a high voltage value. However, no effect takes place when one or both of the flip-flop outputs is at a low voltage value. Consequently, each of the cathodes of mixer stage 47 are lifted once during each chopping period at approximately a half period interval and the duration of these lifted periods is proportional to the time interval between passages through zero of the signals fed to clippers 37 and 45. The output tube 93 of the mixer is cut off when either of the cathodes are lifted. As a result, the output of mixer stage 47 is a series of square wave pulses 62 of the nature shown in Figure 5c. At all times the amplitude of these pulses will be constant but the length of the pulse as shown by the dashed portion of the pulses will be proportional to angle AOC of Figure 3c. Essentially, therefore, mixer stage 47 serves to combine pulses 5a and 5b to provide a resultant pulse when both the reference square wave 61 and the signal square wave 39 are positive. Again mixer 47 serves to provide a pulse when both of the pulses 39 and 61 are negative.

The output pulses 62 of mixer 47 are then passed to a filter 65, one function of which is to provide a D. C. voltage proportional to the duration of pulses 62. A final D. C. voltage signal is therefore provided which is proportional to the phase angle AOC of Figure 3c. It is apparent that if desired, a conventional D. C. volt meter or any D. C. recorder may be employed to indicate the final D. C. voltage.

Filter 65 is preferably adjustable in order to control its time constant, for the purpose of filltering out the noise which will be encountered when the radiation supplied to the detector is small. Referring to Figure 6, a preferred form of circuit for this purpose is illustrated. The output of mixer stage 47 conducted through lead 81 is conducted to a variable filter indicated by numeral 65. The switches illustrated may be used to control filter 65 to increase or decrease the filtering time constant. This serves to change the time constant so as to permit use of the longest possible constant to get the highest signal to noise ratio which is consistent with the time allotted to record the transmission of a sample over a given spectral region. The output of filter 65 is then supplied to an Ayrton shunt 66 which serves as a sensitivity control. The output of shunt element 66 is provided across leads 67 and 63 which are supplied to recorder 83 of Figure 4. Potentiometer 90 serves to adjust to zero the output of shunt 66 for the condition of zero transmission through the sample cell. In effect, potentiometer 90 serves to subtract from the D. C. output of the filter a constant voltage which compensates for the extra pulse length $f-a$ corresponding to the angle FOA of Figure 3c, and which compensates also for the plate voltage of the output stage of the mixer when this stage is in the conductive condition. Potentiometer 69 in series with resistance 68 serves to compensate for any leakance to ground which may exist in the recorder circuit.

In a preferred form of the invention, a particular beam splitting arrangement is employed. This beam splitting arrangement uses the principle illustrated by Figure 7. An objective of the basic arrangement illustrated by Figure 7 is to pass an equal proportion of the two beams of radiation through each portion of the entrance slit of a monochromator and through each portion of an essential optical element, which may be the dispersing element of a spectrophotometer, or may also be the Littrow mirror of a system with folded optics. This result is achieved by locating the beam splitting mirrors at a critical distance from the entrance slit. This distance is established at the point of intersection of the two extreme rays, $b$ and $c$ of Figure 7, each passing through the limits of the slit SS', and of the optical element OO'. At this particular distance in front of the slit there is a line indicated by RR', along which two equal portions A and A' of one beam are arranged as illustrated, while two equal portions B and B' of the other beam are positioned as shown. With this arrangement, the segment EF "seen" from any portion S'' of the slit will contain the same proportions of the two beams as the ends S and S' of the slit. Likewise, any portion O'' of the essential optical element will see along segment EF the same proportion of the two beams as the ends O and O' of this element, and as all portions of the slit.

If the line RR' is not conveniently accessible, the beam splitting may be performed at other points with the same desirable equality of illumination of all portions of the slit and of an essential optical element, but it will be necessary then to interleave three or more portions of each of the two beams, instead of just two as in the case illustrated by Figure 7.

Using this principle therefore, beam splitting mirrors are to be positioned at a location defined by line RR'. Figures 8 and 9 show one form of optical arrangement employing this novel principle of beam splitting. Referring to these figures jointly, the numerals 70 and 71 identify the two optical cells to be employed. A light source 73 is employed to pass radiation to the two converging mirrors 74 and 75. The mirrors are so directed as to pass radiation through the central portion of sample cell 70 and of standard or compensating cell 71, respectively, impinging respectively on converging mirror 76 and on converging mirrors 77 and 78 on the opposite side of the sample cells. Mirrors 76, 77 and 78, which may be called radiation mixing means, then direct the radiation into monochromator 80, mirrors 77 and 78 providing the partial beams designated by B and B' in Figure 7, while the remaining portions A and A' are provided by mirror 76 through the remaining openings between mirrors 77 and 78 and above mirror 77. In this arrangement all mirrors are so positioned that an equal optical path length extends between source 73 and the entrance slit of the monochromator, whether through the sample or standard cell.

In the apparatus illustrated in these figures, the cells 70 and 71 are positioned so as to establish an angle alpha with respect to the center of rotation of the semi-circular chopper 82, which can be adjusted between 90° and 120°. Rotation of chopper 82 by the motor 83 consequently establishes the desired phasing of radiation passed through the two cells in accordance with the principles formerly described. Likewise, the selection and position of mirror 77, and the position of mirror 78 can be effected to determine the maximum sample to standard radiation ratio which corresponds to the selected angle alpha, and which is given by the expression $$2 \sin\left(\text{alpha} - \frac{\pi}{2}\right)$$

A variety of other optical arrangements may be employed to utilize the principles of Figure 7. For instance, instead of placing the two beams in the same horizontal planes as illustrated by Figures 9 and 10, one could provide a beam splitting arrangement in which the sample and standard cells are above each other. In this case the beams from the source would be split up and down into two opposite directions, and additional mirrors would be required to redirect them horizontally into the cells, and again down and up to a median horizontal plane after passage through the cells. On the other hand, this last mentioned arrangement would have the virtue of providing images of the source on the entrance slit which are more nearly of the same size.

The beam splitting arrangements described are particularly applicable to the analysis of solids or liquids. By placing the samples at the point of focus of each of the beams of radiation, loss of light due to scattering is effectively minimized. Again, positioning of the samples at this location serves to permit use of extremely small samples when desired.

In using any one of the beam splitting arrangements described in conjunction with the phase modulation system of this invention, the principles formerly set forth are to be used. For example, means to provide a phasing reference signal are to be associated with the chopper so as to provide the requisite signal input to the electronic system described. This signal is combined with the signals of the detector associated with the monochromator according to the principles of Figure 4.

The steps to be followed in using the apparatus for analytical work may be briefly itemized with particular reference to Figure 6 to clarify the method of operation:

(1) Evacuate the standard cell of the apparatus and mask the sample cell beam.

(2) Set potentiometer 66 to the zero setting of the potentiometer and adjust potentiometer 69 so that the recorder assumes the desired zero setting to indicate zero percent transmission.

(3) Set potentiometer 66 to the full scale position of the potentiometer and adjust potentiometer 90 so that the recorder again indicates zero percent transmission.

(4) Repeat steps 2 and 3 until settings for potentiometers 69 and 90 are found so that the recorder indicates a constant zero transmission value when potentiometer 66 is set either to zero or full scale position.

(5) Evacuate the sample cell, remove the mask cutting off the sample cell beam and keep potentiometers 90 and 69 at their established settings.

(6) Adjust potentiometer 66 so that the recorder reads essentially full scale to provide indication of 100% transmission.

(7) Thereafter, the sample to be analyzed may be placed in the sample cell and the percent transmission will be directly indicated by the recorder.

What is claimed is:

1. The spectrometric method of measuring the ratio of radiation in two beams of radiation which comprises: modulating each of said beams at the same frequency but at different phases to produce two beams of radiation signals having a phase difference between 90 and 180 degrees, converting said radiation signals to an electrical signal having a phrase variation which is in measure of the ratio of radiation in the two beams of radiation, providing a reference electrical signal of the said frequency having a fixed amplitude, combining said reference signal and said first electrical signal, to produce a combined signal and treating said combined signal to provide a D. C. signal output which varies in measure of said ratio.

2. The method defined by claim 1 in which the said reference electrical signal is provided by the periodic interruption of a beam of radiation and the conversion of said interrupted radiation to an electrical signal.

3. The method defined by claim 1 in which a fixed D. C. voltage is subtracted from the D. C. signal output.

4. The spectrometric method of measuring the ratio of radiation in two beams of radiation which comprises: periodically and sequentially interrupting each of said beams of radiation at a fixed frequency to provide two beams of discrete pulses of radiation differing in phase between 90 and 180 degrees, converting said beams of pulses to an electrical signal, shaping said electrical signal to form square wave pulses of constant amplitude and constant duration but varying in phase in measure of the ratio of radiation in said two beams of radiation, providing reference square wave pulses of the said fixed frequency and having fixed amplitude and duration and overlapping in time the first said square wave pulses, combining both of said square wave pulses to obtain new square wave pulses of constant amplitude and with a time width which varies linearly with the overlap in time of both of said square wave pulses, and filtering said new square wave pulses to provide a D. C. signal output which varies linearly with said overlap.

5. The spectrometric method of measuring the ratio of radiation in two beams of radiation which comprises: modulating each of said beams at the same frequency but at different phases to produce two beams of discrete pulses of radiation differing in phase between 90 and 180 degrees, converting said beams of pulses to electrical pulses having fixed amplitude and duration but varying in phase in accordance with changes in the ratio of the intensity of radiation in the two beams of radiation, simultaneously providing reference pulses having the frequency of the said discrete pulses of radiation, mixing said reference pulses and said electrical pulses to provide combined pulses of fixed amplitude but varying in length in measure of the ratio of radiation in the two beams of radiation, and filtering said combined pulses to provide a D. C. signal output.

6. In a phase modulated spectrometric method, the improvement which comprises: modulating each of two beams of radiation at the same frequency differing in phase between 90 and 180 degrees, converting said modulated beams of radiation into electrical pulses varying in phase in accordance with variations in the ratio of the intensity of radiation of said beams, simultaneously providing a reference phase signal, and comparing the phase relation of said reference phase signal to said electrical pulses whereby the ratio of radiation in the two beams may be determined.

7. A phase detection method comprising the steps of: modulating each of two signals at the same frequency with a fixed phase difference of between 90 and 180 degrees, combining said modulated signals and converting said combined signals to electrical pulses of constant amplitude and pulse length but varying in phase in accordance with the ratio of the strength of said two signals, simultaneously providing reference electrical pulses of the said frequency having constant amplitude, constant pulse length and a fixed phase difference with respect to the modulation of said signals, mixing said reference electrical pulses and said combined electrical pulses to provide pulses of constant amplitude and of a width determined by the epochs in time when both of said reference and combined pulses are positive and when both are negative, and filtering said mixed pulses to provide a D. C. signal which varies linearly with said width.

8. A spectrometer including in combination: a source of radiation, a radiation detector having an electrical output, means for directing a first beam of radiation along a first path from said source to said detector, means for directing a second beam of radiation along a second path from said source to said detector, blocking means periodically and sequentially blocking each of said paths whereby an alternating voltage signal is produced by said detector, a reference signal generating means associated with said blocking means adapted to provide a second alternating voltage signal of the frequency of said periodic blocking, circuit means connected to said detector for shaping said alternating voltage signal to provide square wave pulses having fixed amplitude and pulse length, and circuit means connected to said signal generating means for shaping said second alternating voltage signal to provide second square wave pulses of fixed amplitude and pulse length, circuit means adapted to mix said square wave pulses to provide resultant square wave pulses, filter means to convert said resultant square wave pulses to a D. C. voltage, and means to exhibit the magnitude of said D. C. voltage.

9. The combination defined by claim 8 in which each of said circuit means to shape square waves includes clipper and flip-flop elements.

10. The apparatus combination defined by claim 8 including potentiometer means to subtract a fixed D. C. voltage from said first mentioned D. C. voltage.

11. The apparatus combination defined by claim 8 in which the said circuit means to provide square wave pulses includes automatic volume control.

12. Spectometric apparatus comprising in combination: a source of radiation, a monochromator, means for directing a first beam of radiation from said source to the monochromator, means for directing a second beam of radiation from said source to the monochromator, a radiation detector arranged to receive the radiation from the exit slit of said monochromator providing an electrical output, blocking means to interrupt both of said radiation beams at the same periodic frequency and at different phases of the interruption period, circuit means for amplifying the fundamental harmonic of the signal output of the said detector, means for providing a second alternating signal having said periodic frequency, circuit means for deriving from the phase difference between said amplified fundamental harmonic and said second alternating signal a D. C. voltage signal which varies with said phase difference, and means for exhibiting said D. C. voltage signal.

13. The apparatus combination defined by claim 12 including means for combining an adjustable D. C. voltage with said D. C. voltage signal to provide a resultant D. C. voltage output.

14. The apparatus combination defined by claim 12 including means for selecting an adjustable fraction of said resultant D. C. voltage output.

15. The apparatus combination defined by claim 12 in which the said means for directing a first and second beam of radiation to the said monochromator comprises a beam splitting arrangement positioned at a distance from the monochromator determined by the intersection of the extreme rays through the entrance slit of the monochromator and the essential optical element of the monochromator, and radiation mixing means to provide at said intersection two equal portions of one of said beams, interleaved with two equal portions of the other of said beams.

16. In a beam splitting arrangement in which two divided beams of radiation are directed through the entrance slit unto the essential optical element of a monochromator the improvement which comprises: beam splitting means positioned at the intersection of the extreme rays through the said entrance slit and the said essential optical element of the monochromator, and radiation mixing means to provide at said intersection two equal portions of one of said beams, interleaved with two equal portions of the other of said beams.

17. Spectrometric ratio measuring apparatus comprising means for generating two beams of radiation, means for modulating said beams at the same frequency to produce two sets of discrete pulses having a phase difference between 90 and 180 degrees, detecting means for converting said sets of pulses to an electrical signal varying in phase in measure of the ratio of the intensity of radiation in said modulated beams, generating means for producing a reference signal of said frequency and means for combining said reference signal and electrical signal to produce a D. C. signal having an amplitude which is in measure of the ratio of radiation in said beams.

18. Spectrometric ratio measuring apparatus according to claim 17 wherein means are provided for biasing said D. C. signal.

19. Spectrometric apparatus comprising means for generating two beams of radiation, means for modulating each of said beams at the same frequency but at different phases to produce two beams of discrete pulses of radiation differing in phase between 90 and 180 degrees, means for detecting and converting said pulses to produce electrical pulses, means for limiting the amplitude of said electrical pulses, reference signal generating means for producing a set of electrical pulses at a frequency equal to the first said frequency and having a fixed amplitude and pulse length, means for combining said reference pulses with the first said electrical pulses to produce an output signal which varies in measure of the phase difference between both said electrical pulses and means for filtering said output signal to provide a D. C. signal having a magnitude substantially proportional to the ratio of intensity of said two beams of radiation.

20. Phase modulated spectrometric apparatus comprising means for periodically and sequentially interrupting two beams of radiation at the same frequency but with a phase difference of 90 to 180 degrees to provide two beams of discrete pulses of radiation, means for converting said beams of radiation to produce a set of resultant electrical pulses of constant amplitude and duration but with a phase with respect to the periodic interruption of said beams which is variable in accordance with variations in the ratio of intensity of radiation of said two beams, generating means for providing a reference signal consisting of electrical pulses of constant amplitude and duration and with a phase which is fixed with respect to said periodic interruptions, means for mixing both said electrical pulses to provide output signal pulses when both said electrical pulses are positive and when both are negative and means for treating said output signal pulses to provide a D. C. signal having a magnitude substantially proportional to the ratio of intensity of the two beams of radiation.

21. Phase detection apparatus comprising means for modulating two signals at the same frequency with a fixed phase difference of between 90 and 180 degrees, means for converting said signals into a resultant electrical pulse of constant amplitude and pulse length but varying in phase in accordance with the ratio of intensity of said two signals, means for generating a set of reference pulses of a frequency equal to the aforesaid frequency and of constant amplitude and pulse length, means for mixing said electrical reference pulses to provide output signal pulses of constant amplitude when both said electrical and reference pulses are positive and when both are negative and means for treating said output signal pulses to provide a D. C. signal having a magnitude substantially proportional to the ratio of intensity of said two signals.

References Cited in the file of this patent

UNITED STATES PATENTS

| 2,287,322 | Nelson | June 23, 1942 |
| 2,442,910 | Thomson | June 8, 1948 |
| 2,604,810 | Backhouse | July 29, 1952 |